3,687,639
PRODUCTION OF FINELY DIVIDED POTASSIUM SULFATE CRYSTALS
Jan R. Barlow, Moss Point, Miss., and Herbert P. Pursell, Libertyville, Ill., assignors to International Minerals & Chemical Corporation
No Drawing. Filed May 25, 1970, Ser. No. 40,373
Int. Cl. C01d 5/00
U.S. Cl. 23—300                            4 Claims

ABSTRACT OF THE DISCLOSURE

A process of producing finely divided potassium sulfate crystals suitable for use in slurry fertilizers from an aqueous solution containing potassium sulfate which comprises dissolving potassium chloride in the potassium sulfate solution to cause the potassium sulfate to crystallize. Upon dissolution of the potassium chloride, crystals of potassium sulfate are precipitated that are sufficiently fine to be suitable for use in slurry fertilizers.

FIELD OF THE INVENTION

The present invention is directed to a process for producing minute potassium sulfate particles that are suitable for use in slurry fertilizers without further size reduction. More particularly, the present invention is directed to a method of directly producing finely divided potassium sulfate crystals by precipitation from aqueous solutions of potassium sulfate.

BACKGROUND OF THE INVENTION

Although many fertilizer ingredients are soluble in water, they are not sufficiently soluble to provide a practical nutrient concentration. As a consequence, suspension or slurry fertilizers containing a variety of nutrients have evolved in which finely divided particles are suspended in an aqueous solution that is sprayed on the soil. Such fertilizers have become increasingly prominent in recent years. Because it is often necessary to premix and pump a slurry fertilizer, it is desirable that the slurry be relatively stable. While this stability may, in part, be achieved by the use of stabilizing agents, the particle size of the nutrient ingredient plays a significant role in the stability of the slurry. Generally, ingredients having particles substantially all of which (e.g. at least 85%) are —200 mesh are desirable. Finer particles, essentially all of which are —325 mesh, are particularly desirable since they contribute to an even more stable slurry.

The crystallization of potassium sulfate under ordinary conditions by cooling from a saturated solution, or by shock-cooling, typically produces crystals, many of which have a Tyler mesh size of from about 65 to 100 mesh. Since potassium sulfate particles of sizes substantially smaller than this are desirable for use in slurries, it is necessary to reduce the size of such potassium sulfate crystals before they are used for slurry fertilizers. Size reduction such as by comminution not only results in the expense of an added process step but also may result in the loss of some product because of dusting or the like. Crystallization of potassium sulfate from potassium sulfate solutions in such a manner that the crystallized product obtained is of a size suitable for use directly in slurries would avoid a subsequent size reduction step and the increased expense entailed thereby.

PRIOR ART

Potassium sulfate normally is crystallized by cooling heated, substantially saturated solutions of potassium sulfate. As noted earlier, this process results in the production of relatively large crystals having a mesh size of about +100 mesh. In an effort to increase the mesh size even more and thereby make it better suited for use as a solid fertilizer, surfactants may be added to the solution. Shock-cooling solutions of potassium sulfate below the temperature at which the solution will be saturated whereby potassium sulfate is crystallized are also known. This process, once again, results in the production of relatively large crystals.

SUMMARY OF THE INVENTION

It has now been found that it is possible to produce finely divided potassium sulfate crystals from aqueous solutions containing potassium sulfate by adding solid potassium chloride to a potassium sulfate solution in a quantity sufficient to cause precipitation of finely divided potassium sulfate crystals substantially all of which are —200 mesh. Upon dissolution of potassium chloride very fine crystals of potassium sulfate are precipitated almost instantaneously from the solution. By following this technique it is possible to obtain potassium sulfate crystals essentially all of which are —325 mesh (44 microns) in size. Indeed, by the process of this invention it is possible to produce crystals substantially all of which appear to be less than 10 microns in size. After the addition of potassium chloride and the precipitation of potassium sulfate, the solution may be cooled so that additional potassium sulfate precipitates. The product readily may be recovered from the liquor by conventional means such as centrifuging or the like.

It has been suggested that sodium sulfate may be recovered from solutions by treating the solution with sodium chloride so as to cause the solution to approach saturation with sodium chloride. The resultant two-salt solution is cooled whereby sodium sulfate is selectively precipitated. A description of such a process may be found in, e.g. U.S. Patent No. 2,125,624. Such treatment of sodium sulfate crystals, however, produces crystals of relatively large particle size and not the extremely fine crystals obtained following the process of this invention.

DETAILED DESCRIPTION OF THE INVENTION

The practice of this invention is applicable to potassium sulfate solutions or liquors, which desirably are near saturation with respect to $K_2SO_4$ at the initial precipitation temperature. It will be apparent that maximum potential potassium sulfate recovery will occur when a saturated solution of potassium sulfate is employed. Complete saturation, however, is not required since dissolution of potassium chloride will ultimately precipitate potassium sulfate, even in solutions not initially saturated with respect to potassium sulfate. From a practical standpoint, it is generally preferred to employ potassium sulfate solutions that are at least 90% saturated at the precipitation temperature.

Similarly, the quantity of solid potassium chloride added to the potassium sulfate solution may vary, it being important only that a sufficient amount of potassium chloride be added so that potassium sulfate will precipitate when the potassium chloride dissolves. The amount of potassium chloride employed will of course depend on such factors as the solution temperature, the concentration of potassium sulfate and the desired product purity. In order to achieve maximum potassium sulfate recovery, it is preferred to use an amount of potassium chloride approaching that which is mutually soluble in saturated solution with potassium sulfate at the final solution temperature. To avoid substantial contamination of the potassium sulfate product with potassium chloride, it is desirable to employ potassium chloride in an amount below that at which solid phase potassium chloride will remain as a solid at the final temperature. Desirable final potassium chloride concentrations generally will range between about 20% and about 100% of the amount mutually soluble at the final temperature. The particle size of the potassium chloride employed does not appreciably affect the process. It is preferred, however, to employ relatively finely divided potassium chloride in order to obtain rapid dissolution, say −28 mesh, and preferably 48 to 200 mesh.

The process of this invention can be carried out at any temperature between the freezing point and boiling point of the brine solution. Again, from an operational standpoint the process of this invention is best carried out at a temperature between about 80° C. and about 25° C. The process can be carried out at a constant temperature, or after addition of potassium chloride and precipitation of some potassium sulfate, the solution may be cooled to effect precipitation of additional potassium sulfate. The specific temperatures employed are not critical so long as the solution temperature and potassium chloride concentration are correlated to avoid precipitation of potassium chloride. It is possible to obtain the desired potassium sulfate crystals by adding potassium chloride to the solution to cause crystallization at the temperature of the solution, or by adding potassium chloride in an amount less than will cause potassium sulfate to precipitate and then cooling the solution to a temperature at which potassium sulfate will precipitate.

Following precipitation of the potassium sulfate crystals, the crystals may be removed from the mother liquor by various techniques well-known in the art. Such techniques include, without limitation, filtration, centrifuging and the like. After separation from the mother liquor the crystals, if desired, may be washed with water or a potassium sulfate brine to remove residual mother liquor. Drying of the crystals, if desired, can be accomplished by standard means. The crystals, even when moist with mother liquor, do not cake when stored in sealed containers.

The process of the present invention is intended to provide potassium sulfate crystals substantially all of which (e.g., at least 85%) are −200 mesh. By proper selection of operating techniques crystals having a particle size essentially completely −325 mesh readily can be prepared and, as noted earlier, crystals having an extremely small particle size, essentially −10 microns, also have been prepared following the practice of this invention. It will be apparent that each of these products is well suited to be employed directly in a suspension or slurry fertilizer.

The process of the present invention is particularly useful in the recovery of potassium sulfate from spent crystallizer liquors or from off-grade potassium sulfate materials such as dust collector fines. In crystallizing potassium sulfate, a small amount of surfactant is added to the hot sulfate solution to increase the crystal size of the product. Surfactants such as disodium dodecyloxybenzine sulfonate generally are employed in amounts ranging from about 0.02% to about 0.08% of the solution. The solution is at a temperature of about 55° C. when potassium sulfate product is crystallized. The spent liquors from such crystallization processes can be treated with the process of the present invention to obtain very fine potassium sulfate crystals, even though they contain small amounts of surfactant. Thus, it is possible to produce large potassium sulfate crystals using a hot sulfate process, and to obtain very finely divided potassium sulfate crystals from the spent crystallizer liquors, by employing the technique of the present invention.

The process of this invention can be practiced by crystallizing potassium sulfate from a saturated potassium sulfate solution as described in the preceding paragraph, removing the potassium sulfate crystals from the mother liquor, adding solid potassium chloride to the mother liquor to form finely divided potassium sulfate crystals substantially of a size less than 200 mesh, and separating the finely divided potassium sulfate crystals from the mother liquor.

Potassium sulfate frequently is found in association with small amounts of chlorides and sulfates of other alkali metals or alkaline earth metals such as sodium, magnesium and calcium. The presence of small amounts of these materials, such as, for example, up to 6% based on the weight of the potassium sulfate does not materially adversely affect the process of this invention. Industrial sources of potassium sulfate, therefore, readily may be employed in the process of this invention.

The process of the present invention will be further exemplified by the following specific embodiments which are included for illustrative purposes only.

Example I

A saturated potassium sulfate solution was prepared from fertilizer grade potassium sulfate at about 80° C. and filtered to remove insolubles. Potassium chloride solids, in an amount equivalent to 50% of that required to saturate the solution with the two salts at 25° C. was added while stirring. The potassium chloride dissolved and almost immediately caused the formation of very fine potassium sulfate crystals. The resultant slurry was cooled to about 25° C. and was then filtered with filter paper. The solid potassium sulfate retained on the filter paper was washed with a potassium sulfate solution, washed with chlorothene and methanol, and dried at ambient temperature. The resultant crystals were essentially −325 mesh and of high purity. The analysis of the mother liquor and the solids were as follows:

TABLE I.—PERCENT BY WEIGHT

|  | Brine | Solids |
| --- | --- | --- |
| K | 6.80 | 43.62 |
| Mg+Ca | 0.24 | 0.06 |
| Na | 0.13 | 0.03 |
| Cl | 4.56 | 0.04 |
| $SO_4$ | 3.40 | 53.72 |

The remaining unaccounted for portion of the solids is undoubtedly water due to inadequate drying.

A series of experiments were run, under as nearly identical conditions as practical, to demonstrate the fine crystals obtained according to the practice of this invention and to compare the potassium sulfate-potassium chloride system with the sodium sulfate-sodium chloride system. Each of the tests reported represents an average of three runs. Reagent grade materials were employed for the tests. In some instances small amounts (300 p.p.m. based on the sulfate weight) of disodium dodecyloxybenzene sulfonate surfactant was added. The results are reported in Examples II through V.

Example II

| Material | Without surfactant | | With 300 p.p.m. surfactant | |
| --- | --- | --- | --- | --- |
|  | $K_2SO_4$ | $Na_2SO_4$ | $K_2SO_4$ | $Na_2SO_4$ |
| Initial brine temp., ° C | 30 | 30 | 30 | 30 |
| Final temp., ° C | 30 | 30 | 30 | 30 |
| Mols $SO_4$ | 13.3 | 52.0 | 13.3 | 52.0 |
| Mols Cl | 22.2 | 25.2 | 22.2 | 25.2 |
| Analyses: | | | | |
| Liquor, percent: | | | | |
| $SO_4^{2-}$ | 1.72 | 11.91 | 1.74 | 11.91 |
| $Cl^-$ | 7.43 | 7.15 | 7.31 | 7.05 |
| Sp. gr | 1.123 | 1.256 | 1.122 | 1.255 |
| Solid, percent: | | | | |
| $SO_4^{2-}$ | 54.60 | 66.76 | 54.58 | 66.63 |
| $Cl^-$ | .24 | .16 | .27 | .26 |
| Screen analysis of product, percent cumulative: | | | | |
| 28 |  | .6 |  | .4 |
| 35 |  | 7.7 |  | 6.8 |
| 48 |  | 15.7 |  | 12.4 |
| 65 |  | 18.5 |  | 14.2 |
| 100 |  | 27.0 |  | 21.6 |
| 150 |  | 40.5 |  | 36.0 |
| 200 |  | 61.1 |  | 57.8 |
| 325 |  | 86.9 |  | 87.8 |
| −325 | 100 | 13.1 | 100 | 12.2 |

Example III

| Material | Without surfactant | | With 300 p.p.m. surfactant | |
|---|---|---|---|---|
| | $K_2SO_4$ | $Na_2SO_4$ | $K_2SO_4$ | $Na_2SO_4$ |
| Initial brine temp., °C | 55 | 55 | 55 | 55 |
| Final temp., °C | 55 | 55 | 55 | 55 |
| Mols $SO_4$ | 17.8 | 58.0 | 17.8 | 58.0 |
| Mols Cl | 26.4 | 26.4 | 26.4 | 26.4 |
| Analyses: | | | | |
| Liquor, percent: | | | | |
| $SO_4^{2-}$ | 2.11 | 15.83 | 2.00 | 17.30 |
| Cl⁻ | 8.11 | 4.05 | 8.65 | 2.95 |
| Sp. gr | 1.137 | 1.257 | 1.142 | 1.270 |
| Solid, percent: | | | | |
| $SO_4^{2-}$ | 54.08 | 44.45 | 53.43 | 38.73 |
| Cl⁻ | .28 | 20.63 | .64 | 25.73 |
| Screen analysis of product, percent cumulative: | | | | |
| 28 | | | 1.1 | 1.0 |
| 35 | | | 29.6 | 36.0 |
| 48 | | | 63.8 | 68.1 |
| 65 | | | 71.1 | 76.4 |
| 100 | | | 73.3 | 78.2 |
| 150 | | | .2 | |
| 200 | .5 | 79.7 | .8 | 84.1 |
| 325 | 58.2 | 20.3(−200) | 1.5 | 15.9(−200) |
| −325 | 41.8 | | 98.5 | |

Example IV

| Material | Without surfactant | | With 300 p.p.m. surfactant | |
|---|---|---|---|---|
| | $K_2SO_4$ | $Na_2SO_4$ | $K_2SO_4$ | $Na_2SO_4$ |
| Initial brine temp., °C | 80 | 80 | 80 | 80 |
| Final temp., °C | 30 | 30 | 30 | 30 |
| Mols $SO_4$ | 22.0 | 54.7 | 22.0 | 54.7 |
| Mols Cl | 22.2 | 25.2 | 22.2 | 25.2 |
| Analyses: | | | | |
| Liquor, percent: | | | | |
| $SO_4^{2-}$ | 1.69 | 16.90 | 1.71 | 16.90 |
| Cl⁻ | 7.35 | 3.87 | 7.29 | 4.07 |
| Sp. gr | 1.121 | 1.286 | 1.122 | 1.288 |
| Solid, percent: | | | | |
| $SO_4^{2-}$ | 54.39 | 39.60 | 54.39 | 42.31 |
| Cl⁻ | .19 | 24.90 | .30 | 22.40 |
| Screen analysis of product, percent cumulative: | | | | |
| 28 | .7 | 2.7 | | .9 |
| 35 | 1.0 | 28.1 | | 26.2 |
| 48 | 1.7 | 59.2 | | 64.1 |
| 65 | 2.5 | 66.3 | .6 | 73.5 |
| 100 | 3.4 | 69.4 | 1.3 | 75.2 |
| 150 | 4.9 | | 4.0 | |
| 200 | 12.4 | 77.2 | 41.6 | 80.0 |
| 325 | 79.7 | 22.8(−200) | 86.0 | 20.0(−200) |
| −325 | 21.3 | | 14.0 | |

Example V

| Material | Without surfactant | | With 300 p.p.m. surfactant | |
|---|---|---|---|---|
| | $K_2SO_4$ | $Na_2SO_4$ | $K_2SO_4$ | $Na_2SO_4$ |
| Initial brine temp., °C | 80 | 80 | 80 | 80 |
| Final temp., °C | 55 | 55 | 55 | 55 |
| Mols $SO_4$ | 22.0 | 54.7 | 22.0 | 54.7 |
| Mols Cl | 26.4 | 26.4 | 26.4 | 26.4 |
| Analyses: | | | | |
| Liquor, percent: | | | | |
| $SO_4^{2-}$ | 1.95 | 17.43 | 1.83 | 16.63 |
| Cl⁻ | 8.65 | 2.87 | 8.93 | 3.35 |
| Sp gr | 1.142 | 1.270 | 1.144 | 1.267 |
| Solid, percent: | | | | |
| $SO_4^{2-}$ | 54.08 | 36.27 | 53.43 | 40.60 |
| Cl⁻ | .24 | 28.87 | .63 | 25.40 |
| Screen analysis of product, percent cumulative: | | | | |
| 28 | | | 1.2 | 1.0 |
| 35 | | | 34.8 | 27.7 |
| 48 | | | 65.2 | .8 | 60.7 |
| 65 | | | 71.9 | 1.9 | 68.9 |
| 100 | | | 73.5 | 2.7 | 71.8 |
| 150 | | | 3.5 | |
| 200 | .6 | 80.2 | 4.4 | 80.5 |
| 325 | 1.2 | 19.8(−200) | 7.4 | 19.5(−200) |
| −325 | 98.8 | | 92.6 | |

The results reported in Examples II–V demonstrate that the process of this invention readily produces extremely finely divided potassium sulfate crystals. That result does not obtain when the process is applied to sodium sulfate.

We claim:

1. A process for producing finely divided potassium sulfate crystals from an aqueous potassium sulfate solution comprising addin gsolid potassium chloride which is substantially all −28 mesh to an aqueous solution which is at least about 90% saturated with respect to potassium sulfate at an initial temperature, said solid potassium chloride being added in an amount in the range of about 20–100% of the amount of potassium chloride which is mutually soluble with potassium sulfate at a final crystallization temperature, cooling said aqueous solution from said initial temperature to said final temperature, whereby potassium sulfate crystals of a size less than about 200 mesh are produced, and recovering said potassium sulfate crystals, said initial temperature and final temperature both being in the range of about 80° C. to 25° C.

2. The method in acordance with claim 1 in which said potassium sulfate solution is contaminated with a small amount of a surfactant.

3. The process of producing potassium sulfate crystals which comprises:
   (a) crystallizing potassium sulfate from a saturated potassium sulfate solution;
   (b) removing the potassium sulfate crystals from the solution;
   (c) adding solid potassium chloride which is substantially entirely −28 mesh to said solution in an amount between 20% and 100% of the potassium chloride mutually soluble with potassium sulfate at a final crystallization temperature;
   (d) cooling said solution from said initial temperature to said final crystallization temperature, said initial temperature and final temperature being both in the range of 80° C. to 25 °C.; and
   (e) separating further crystallized finely divided potassium sulfate from said solution.

4. The process of claim 3 wherein the potassium sulfate solution contains a small amount of surfactant.

References Cited

UNITED STATES PATENTS

| | | | |
|---|---|---|---|
| 2,125,624 | 8/1938 | Davis | 23—121 |
| 2,295,257 | 9/1942 | Butt et al. | 23—121 |
| 3,271,106 | 9/1966 | Nylander | 23—121 |
| 1,256,068 | 2/1918 | Sommer | 23—305 |
| 2,333,138 | 11/1943 | Adams | 23—121 |

FOREIGN PATENTS

| | | | |
|---|---|---|---|
| 27,246 | 1967 | Japan | 23—121 |

OTHER REFERENCES

Chem. Abstract, volume 54, 1960, 23678a.

NORMAN YUDKOFF, Primary Examiner

J. SILVERBERG, Assistant Examiner

U.S. Cl. X.R.

23—302, 121

PO-1050
(5/69)

UNITED STATES PATENT OFFICE
CERTIFICATE OF CORRECTION

Patent No. 3,687,639          Dated October 6, 1972

Inventor(s) Jan R. Barlow and Herbert P. Pursell

It is certified that error appears in the above-identified patent and that said Letters Patent are hereby corrected as shown below:

Column 6, claim 3, line 34, after "between", insert --about--.

Signed and sealed this 13th day of February 1973.

(SEAL)
Attest:

EDWARD M. FLETCHER, JR.          ROBERT GOTTSCHALK
Attesting Officer          Commissioner of Patents